United States Patent [19]

Ghitea, Jr. et al.

[11] Patent Number: 5,693,876
[45] Date of Patent: Dec. 2, 1997

[54] FUEL ECONOMY DISPLAY FOR VEHICLES

[75] Inventors: Nicolae Ghitea, Jr., Tigard, Oreg.; James M. Ehlbeck, La Center, Wash.

[73] Assignee: Freightliner Corporation, Portland, Oreg.

[21] Appl. No.: 655,841

[22] Filed: May 31, 1996

[51] Int. Cl.$^6$ .................................................. G01M 15/00
[52] U.S. Cl. ............................................ 73/114; 340/439
[58] Field of Search .......................... 73/113, 114, 116, 73/117.2, 117.3; 340/439

[56] References Cited

U.S. PATENT DOCUMENTS

| | | | |
|---|---|---|---|
| 4,400,779 | 8/1983 | Kosuge et al. | 73/114 |
| 4,475,380 | 10/1984 | Colovas et al. | 73/114 |
| 4,502,124 | 2/1985 | Grohmann et al. | 73/113 |
| 4,564,905 | 1/1986 | Masuda et al. | 73/114 |
| 4,570,226 | 2/1986 | Aussedat | 73/113 |
| 4,663,718 | 5/1987 | Augello et al. | 73/114 |
| 4,706,083 | 11/1987 | Baatz et al. | 73/113 |
| 4,845,630 | 7/1989 | Stephens | 73/113 |
| 5,148,702 | 9/1992 | Gulick, Jr. | 73/114 |

OTHER PUBLICATIONS

Enhances Driver Performance, Detroit Diesel Corporation, ProDriver™.

ProDriver™ User Manual, Detroit Diesel Corporation, Mar., 1994.

Operating & Error Codes, FloScan Instrument Company, Inc., Apr. 1993.

Primary Examiner—George M. Dombroske
Attorney, Agent, or Firm—Klarquist Sparkman Campbell Leigh & Whinston

[57] ABSTRACT

An improved fuel economy device computes a filtered rate of change of instantaneous fuel economy or a filtered instantaneous fuel economy and repetitively updates a graphical display depicting the current fuel economy. The fuel economy can be displayed as a percentage of a target fuel economy, programmed by the driver or other operator of the vehicle.

21 Claims, 8 Drawing Sheets

FUEL ECONOMY DISPLAY FOR VEHICLES

BACKGROUND OF THE INVENTION

Because of the high cost of fuel, significant cost savings can be achieved by enabling drivers, especially drivers of long-haul trucks, to increase fuel economy. A number of fuel economy instruments have been developed to allow drivers to monitor fuel economy. Many of these devices, however, are not effective because they provide inaccurate or misleading information. Some fuel economy instruments fail to provide the driver with helpful feedback on how certain driver actions impact fuel economy. In some cases these devices are ineffective because they react too slowly to driver actions, and therefore, do not inform the driver how his or her actions impacted the fuel economy. In other cases, the fuel economy indicator is too sensitive to changes in the fuel rate. In these latter cases, the indicator reading changes rapidly and erratically, distracting the driver. To be truly effective, a fuel economy indicator should be accurate, responsive to driver actions, meaningful to the driver and not distracting or annoying.

One measure of fuel economy, called instantaneous fuel economy, refers to the computation of miles per gallon at one instant in time. This quantity is calculated from the vehicle's speed and the fuel consumption rate. Merely computing and displaying instantaneous fuel economy produces erratic results. The use of electronic signal processing to smooth these signals does help, however, to produce a more stable measure of fuel economy.

Another measure of fuel economy is the "average" fuel economy. This quantity is computed by simply dividing the distance traveled by the amount of fuel consumed. This quantity is not very helpful to the driver because it does not provide adequate feedback as to how discrete driver actions impact fuel economy.

One attempt to provide more helpful feedback involves computing a ratio of instantaneous fuel consumption to average fuel consumption. While this ratio may provide more helpful feedback than merely computing the instantaneous or the average fuel consumption, it suffers from drawbacks. The average fuel economy is zero at the beginning of a trip, and as a result, the ratio of instantaneous to average fuel consumption is undefined. As the vehicle accumulates more miles, the value of the ratio moves toward the average fuel consumption. Thus, the ratio of instantaneous to average fuel consumption tends to be an inaccurate and confusing fuel economy indicator to the driver.

In addition to the accurate measurement and computation of fuel economy, the presentation of fuel economy to the driver is also important. If an instrument fluctuates rapidly, it conveys little, if any useful information and is distracting to the driver. On the other hand, if the display is static, it fails to give valuable feedback in response to specific driver actions. For example, a driver may want to know whether shifting gears significantly impacts fuel economy. Static displays fail to provide the necessary rapid feedback to the driver. Therefore, a need exists for an improved fuel economy determining apparatus and method and for an improved vehicle fuel economy display.

SUMMARY OF THE INVENTION

The invention provides an improved fuel economy device and method. One embodiment of the device includes a control unit that computes and controls the display of fuel economy in a vehicle. The control unit is in communication with a fuel sensor for measuring the fuel rate and a speed sensor for measuring road speed. The control unit computes a weighted instantaneous fuel economy representation by combining current and selected previous instantaneous fuel economy values on a weighted basis. To display the fuel economy, the control unit repetitively updates a graphical display, such as a bar graph display, at discrete time intervals. The rate of change in the displayed value is preferably restricted so that it changes smoothly and minimizes distractions to the driver.

One embodiment of the invention computes a representation of the fuel economy by combining weighted values of the instantaneous fuel economy from different intervals. In one specific example, a control unit computes a fuel economy representation by combining a weighted value of the current instantaneous fuel economy with a weighted value of the fuel economy computed for one or more prior intervals. The representation of the rate of change of instantaneous fuel economy can be computed in a similar fashion.

In one specific embodiment, the control unit computes a filtered rate of change of instantaneous fuel economy. It computes instantaneous fuel economy by dividing road speed by the fuel rate. It filters the rate of change of fuel economy by summing the weighted current change of instantaneous fuel economy, and the weighted prior rate of change of the fuel economy. The control unit then updates the display with the current value of the filtered fuel economy. To smooth the transitions between updates of the display, the control unit most preferably limits the maximum amount of change in the display from one update to the next.

In another specific embodiment, the control unit computes a filtered value for the fuel economy from the instantaneous fuel economy, and displays the fuel economy as a percentage of a predefined target fuel economy. The target fuel economy can be preset or more preferably programmed by the driver, fleet owner, or other operator via the user interface provided by the control unit. The control unit, in this embodiment computes the filtered fuel economy by weighting the current instantaneous fuel economy and a filtered value the instantaneous fuel economy computed for a previous interval. The filtered instantaneous fuel economy can be averaged over a number of intervals to compute a short term average fuel economy. Either the instantaneous or the short term average fuel economy can then be compared to the target value. The control unit in this case may be coupled to a display device for graphically displaying the fuel economy as a percentage of the target fuel economy.

The fuel economy devices summarized here and described below have a number of advantages over existing fuel economy indicators. The fuel economy is computed and displayed so that the driver can see how his or her actions affect fuel economy. For example, if the driver accelerates or shifts gears, these actions are almost immediately reflected in the fuel economy display. Moreover, the fuel economy display is more accurate because it does not have to be based on the trip average fuel economy or the total distance travelled which can vary. While the fuel economy display is responsive to driver actions, it is designed to change smoothly so as not to distract the driver. The fuel economy values can be filtered based on programmable coefficients and limited in a manner that prevents the display from being erratic or changing abruptly.

Further advantages and features of the invention will become apparent with reference to the following detailed description and accompanying drawings.

DESCRIPTION OF THE PREFERRED EMBODIMENTS

Figure 1:
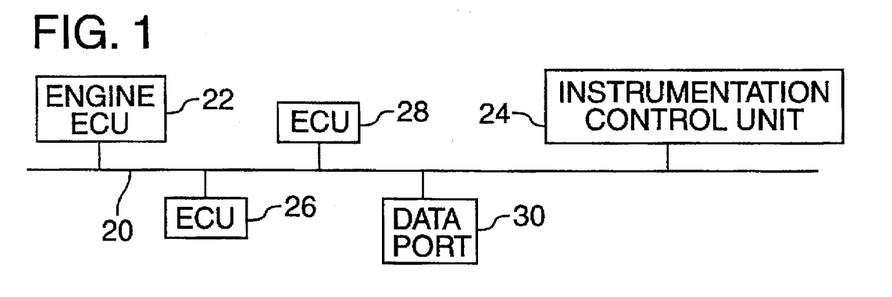
FIG. 1 is a block diagram illustrating the system architecture in a truck for one embodiment of the invention.

FIG. 1 is a block diagram illustrating the system architecture in a truck for one embodiment of the invention. The system architecture includes a number of electronic control units (ECU) interconnected via a data link 20. In particular, the illustrated system includes an engine ECU 22, located at the engine, and an instrumentation control unit 24, located at the dash of the truck. As shown, other optional ECUs 26, 28 can be connected to the data link 20. Finally, the system includes an optional data port 30, for coupling external data processing equipment to the ECUs on board the truck. This data port enables an external computer, for example, to receive and transmit messages on the data link. It also enables an external computer to download data or a file to an ECU and to receive data or a file from an ECU.

Figure 2:
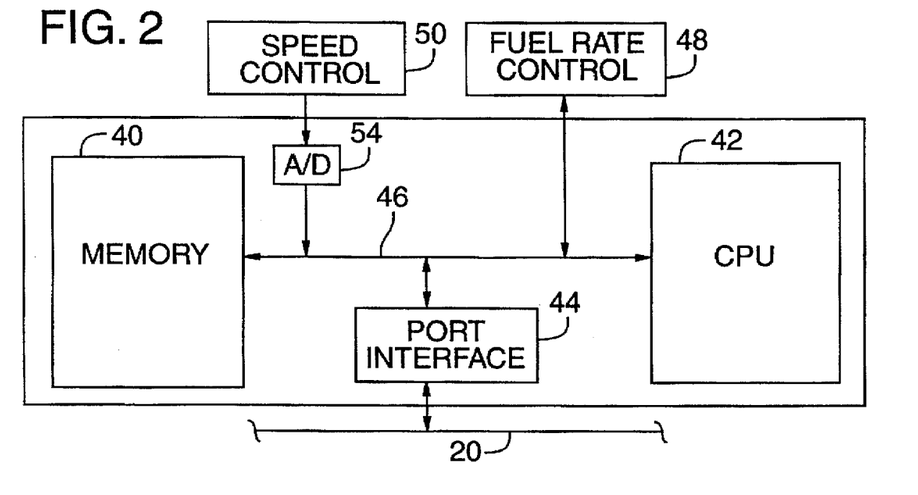
FIG. 2 is a block diagram illustrating the engine electronic control unit (ECU) in more detail.

FIG. 2 is a block diagram illustrating the engine ECU in more detail. The engine ECU includes memory 40, a CPU 42, and a port interface 44 connected via a bus structure 46. The CPU 42 executes routines stored in the memory 40 to control and monitor engine performance. The port interface 44 serves as a link between the CPU 42 and a serial communication path called the data link 20.

The engine ECU also includes a variety of sensors and controls for monitoring and controlling engine performance. This implementation of the ECU includes a fuel rate control 48 and a speed sensor 50. The ECU in combination with the fuel rate control serves as a fuel rate measuring device for the system. The engine ECU receives data representing motion of the vehicle from the speed sensor and computes vehicle speed from this data. The engine ECU also serves as a fuel rate measuring device. Since it controls the flow of fuel to the engine, it is capable of determining the fuel rate.

It should be noted that there are a number of well known methods to measure the fuel rate, and the use of the engine ECU is just one implementation. For example, net fuel flow may be measured in a diesel truck by obtaining the difference between the fuel being delivered to the engine from the fuel returned from the engine using conventional flow meters. In light of the variety of fuel rate measurement devices available, we refer to them generally as fuel rate measuring devices.

In this implementation the engine ECU determines the amount of fuel supplied to the cylinders in the engine by controlling the solenoid valves that inject fuel to the engine cylinders. The rate of fuel flow is directly related to the amount of time that the solenoid valve is closed. This time period determines the volume of fuel injected into a cylinder per revolution. By determining the amount of time that the solenoid valves are closed, the engine ECU can compute the amount of fuel flowing into the engine. The engine ECU calculates the fuel flow rate from the dwell of the injection pulse and the engine speed.

In this embodiment, the engine ECU is also responsible for measuring and computing the vehicle's road speed. Again, there are a number of known methods to measure speed which may be used on the present invention.

One particular method used in this implementation is to sense the speed of rotation of the tail shaft of the truck. A magnetic sensor located on the tail shaft generate an analog signal comprised of a series of pulses representing the rotation rate of the engine. The engine ECU includes an analog to digital (A/D) converter 54 to convert this analog signal into a digital signal. It is programmed to read this digital value and derive the instantaneous speed in miles per hour.

Figure 3:
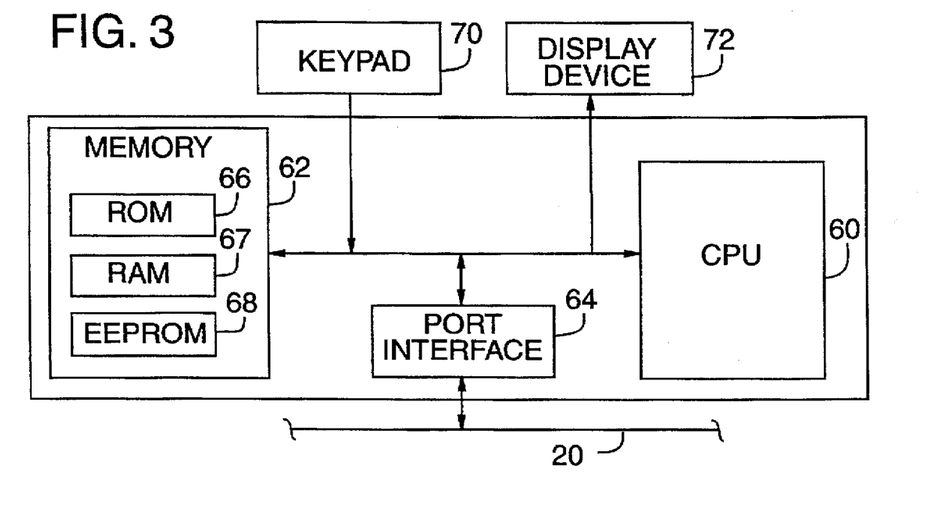
FIG. 3 is a functional block diagram illustrating the architecture of the instrumentation control unit (ICU).

FIG. 3 is a functional block diagram illustrating the architecture of one implementation of an instrumentation control unit (ICU). This instrumentation control unit includes a CPU 60, memory 62 and a port interface 64 for connecting the unit to the data link 20. The memory 62 includes programmable ROM (EEPROM) 66, RAM 67 and permanent ROM 68. The routines for controlling the ICU are stored in ROM 68, while re-configurable data is stored in the EEPROM 68.

In one specific implementation, the ICU includes a 68HC11 microprocessor from Motorola Corporation, and its memory 62 comprises EEPROM, ROM, and RAM. This specific ICU has 8 KB of external EEPROM, 128K of ROM and 2K of RAM. The internal memory of the CPU comprises 256 Bytes of RAM and 512 bytes of EEPROM. This is only one specific implementation of the ICU. A variety of conventional processors and memory systems can be used to implement the functionality of the instrumentation control unit.

The ICU also preferably includes an input device 70 and a display device 72. In one implementation, the input device is a ten key keypad 70, but the specific design of the input device can vary. The design of the input device can vary. The display device 72 provides a textual and graphical output to the driver display. In one specific implementation, the display device comprises a two by 20 vacuum fluorescent display.

The particular ICU used in this implementation is manufactured by Joseph Pollak of Boston, Mass. for Freightliner Corporation. The instrumentation control unit is presently available as a replacement part from Freightliner Corporation.

The data link 20, in this implementation, is a serial communication path connecting the ECUs together. This particular data link is designed according to SAE J1708, a standard for serial data communication between microcomputer systems in heavy duty vehicle applications. While this specific embodiment is based on the J1708 standard, it is not critical that the invention be implemented in this specific manner. One possible alternative is to use a data link constructed according to SAE J1939. The communication link need not be a shared communication path. It is also possible to connect fuel rate and speed sensors to the control unit responsible for computing and displaying fuel economy.

In the embodiment shown in FIG. 1, the data link 40 is comprised of a twisted pair cable operating at 9600 baud. Designed according to the SAE J1708 standard, the data link forms a communication channel among electronic control units coupled to it. Electronic control units generate a digital signal on the data link by applying a voltage differential between the two wires in the cable. A voltage differential above a specified threshold represents a logic high value, while a voltage threshold below a specified threshold represents a logic low value. This type of data link is particularly advantageous for hostile environments because the signal is more robust and impervious to signal degradation. However, other alternative communication media could be used in place of the J1708 cable.

The ECUs connected on the network communicate with each other according to protocols defined in SAE J1708 and SAE J1587. The SAE J1587 standard is entitled "Joint SAE/TMC Electronic Data Interchange Between Microcomputer Systems and Heavy Duty Vehicle Applications." This standard defines one format for data and messages communicated among microprocessors connected to a shared data link, and is specifically adapted for use with SAE J1708.

According to SAE J1708/J1587, the ECUs on the data link communicate by passing messages to each other. The ECUs can be either receivers, or receivers and transmitters. In this particular implementation, the instrumentation control unit and the engine ECU are both transmitters and receivers. For the purpose of measuring fuel economy, the engine ECU acts as a transmitter, sending messages to the ICU regarding road speed and fuel rate.

In this format, a message includes the following: 1) a module ID (MID), 2) one or more parameters, and 3) a checksum. The number of parameters in a message is limited by the total message length defined in the SAE J1708 standard. The message identification numbers are assigned to transmitter categories as identified in SAE J1587. The MID portion of a message specifies the origin or transmitter of the message. In the majority of cases, messages are broadcast on the data link without specifying a receiver. However, the message format can be extended to include the MID of a receiver after the MID of the transmitter for special applications.

The messages passed among the ECUs convey information about one or more parameters contained within the messages. According to the SAE J1587 standard, the first character of every parameter is a parameter identification character (PID). The parameter identified by the PID directly follows the PID. The SAE J1587 supports different data formats including a single character, a double data character or more than two data characters representing the parameter data. Several parameters can be packed into a message, limited by the maximum message size as noted above.

Again, in this implementation, the ECUs communicate with each other over the data link according to the SAE standard J1708. The standard describes methods for accessing the data link and constructing messages for transfer over it. It also defines a method for resource contention among the ECUs on the data link An ECU wishing to transmit data on the data link first waits for a lull in transmission of data on the data link. In this particular implementation the length of the lull is 1.04 milliseconds. After detecting this lull, the ECU attempts to transmit its message. The transmitter broadcasts its message onto the data link. Each of the ECUs that operate as receivers on the data link will receive the message. However, receivers only act on a message if programmed to do so.

In some cases two or more transmitters may attempt to broadcast a message at one time, giving rise to a collision. To resolve a conflict among transmitters, messages have a priority according to their message identifiers. The MIDs of higher priority transmitters have a greater number of bits set at a logic level one. When more than one message is broadcast at a time, the more dominant message takes priority over lesser dominant messages. Since a lower priority message is blocked by a higher priority message, the transmitter of the lower priority message must wait and retransmit the message after another lull. An ECU on the data link will continue to attempt to send a message until it is successfully broadcast to the data link.

Among the parameters defined in SAE J1587, there are two that are particularly relevant to fuel economy in this implementation. The first is PID 84, which represents the road speed. The second is PID 183 which represents the fuel rate. The engine ECU transmits both of these parameters in this implementation. The details of the road speed parameter are set forth below:

| Data Length: | 1 character | |
|---|---|---|
| Data Type: | Unsigned short integer | |
| Bit Resolution: | 0.805 km/h (0.5 mph) | |
| Maximum Range: | 0 to 205.2 km/h (0 to 127.5 mph) | |
| Transmission Update: | 0.1 s | |
| Message Priority: | 1 | |
| Format: | PID | Data |
| | 84 | a |
| | a | road speed |

The details of the fuel rate parameter are set forth below:

| Parameter Data Length: | 2 characters | |
|---|---|---|
| Data Type: | Unsigned integer | |
| Bit Resolution: | $16.428 \times 10^{-6}$ L/s ($4.34 \times 10^{-6}$ gal/s) | |
| Maximum Range: | 0.0 to 1.076 65 L/s (0.0 to 0.28442190 gal/s) | |
| Transmission Update: | 0.2 s | |
| Message Priority: | 3 | |
| Format: | PID | Data |
| | 183 | aa |
| | aa | fuel rate |

Engine control units capable of transmitting the road speed and fuel rate parameters include: the DDEC III provided with Detroit Diesel engines from Detroit Diesel Corporation of Detroit, Mich.; the ADEM II provided with Caterpillar engines from Caterpillar, Inc., Engine Division of Mossville, Ill.; and the CELECT+ provided with Cummins engines from Cummins Engine Company of Columbus, Ind.

Figure 4:
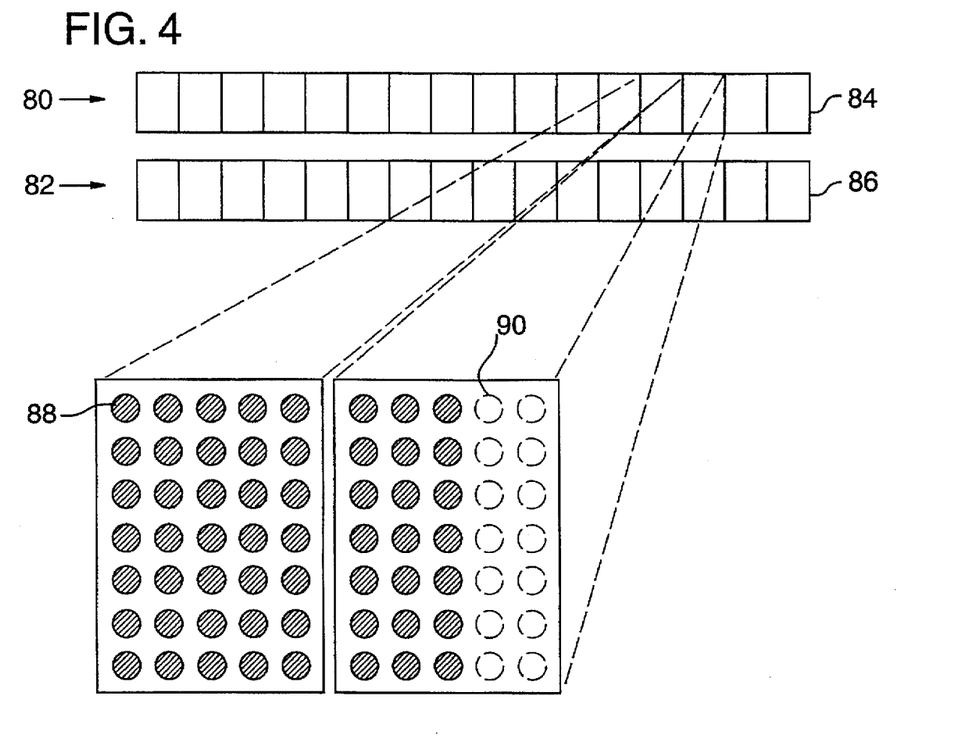
FIG. 4 is a diagram illustrating one embodiment of the display device for the ICU.

FIG. 4 is a diagram illustrating one specific embodiment of the display device for the instrumentation control unit. The display area includes two rows 80, 82 of 16 display elements (84, 86 for example). Each of the individual display elements are comprised of a 5×7 array of pixels (88, 90 for example).

Figure 5:
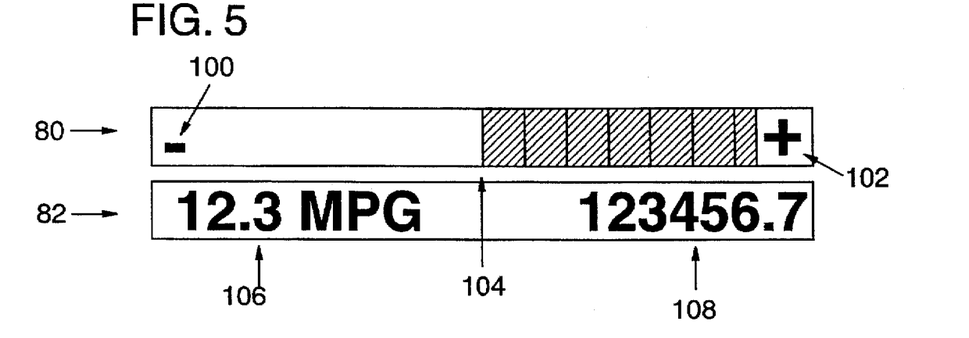
FIG. 5 is a diagram illustrating the format of the display during normal driving conditions in one embodiment.

FIG. 5 is a diagram illustrating one preferred format of the message center during normal driving conditions. The top bar 80 of the message center displays a negative sign 100 in the left-most element and a positive sign 102 in the right-most element. The center 104 of the top bar provides a reference point or origin for the fuel economy display. The lower bar of the message center displays the short term average fuel economy in miles per gallon on the left side 106, and a seven digit odometer reading on the right side 108.

For the message center depicted in FIG. 5, the instrumentation control unit computes quantities for a numerical and a graphical representation of the fuel economy based on the road speed and fuel rate parameters from the engine ECU. Both the numerical and graphical quantities are computed from the instantaneous fuel economy. The instantaneous fuel economy is calculated using the equation:

$$IFE_t = road\ speed_t(PID\ 84)/fuel\ rate_t\ (PID\ 183)$$

The subscript notation $._t$ refers to the time at which the instantaneous fuel economy is calculated. The instrumentation control unit preferably computes the instantaneous fuel economy periodically, such as every 200 ms, which corresponds to the rate at which PID 84 and PID 183 are transmitted to the instrumentation control unit. If the magnitude of the instantaneous fuel economy is greater than 99.9 or if the fuel rate is zero, the magnitude of the instantaneous fuel economy is set to 99.9 in this particular implementation.

The instrumentation control unit computes a representation of the fuel economy by combining values for the instantaneous fuel economy or the rate of change of instantaneous fuel economy from different intervals. For instance in one method, the instrumentation control unit combines a value for the current instantaneous fuel economy with a value of the instantaneous fuel economy for one or more previous intervals. Similarly, the instrumentation control unit combines a value for the current rate of change of instantaneous fuel economy with a value of the rate of change of instantaneous fuel economy for one or more previous intervals. More specifically, the instrumentation control unit combines a weighted value of the current instantaneous fuel economy with a weighted value of the instantaneous fuel economy computed from prior intervals. Similarly, the instrumentation control unit combines a weighted value of the current rate of change of instantaneous fuel economy with a weighted value of the rate of change of instantaneous fuel economy computed from prior intervals.

The instrumentation control unit can compute this representation of the fuel economy without using trip or leg values such as the trip or leg distance, or total fuel volume consumed over a trip or leg of a trip. A trip or leg of a trip is sometimes defined as a period starting at a point where the fuel economy device is reset or initialized and continuing to the current point in time.

In one embodiment, the representation of instantaneous fuel economy is computed in the instrumentation control unit by digitally filtering the instantaneous fuel economy values. The instrumentation control unit performs digital filtering using predefined filter coefficients either permanently programmed into the instrumentation control unit or downloaded from the data port on the data link. The specific expression for computing the filtered instantaneous fuel economy (FIFE) in this embodiment is set forth below:

$$FIFE_t = (c_1 * IFE_t + c_2 * FIFE_{t-1})/256,\ where\ c_1 + c_2 = 256$$

Both $c_1$ and $c_2$ are filter coefficients which are specified as inputs to the configuration file of the instrumentation control unit. To initiate the process, the filtered instantaneous fuel economy is initially set to the instantaneous fuel economy at the starting time t=0. The numerical value of the filtered fuel economy is displayed as shown in the message center and is updated every 200 ms. The bar graph (shown in FIG. 5) displays the rate of change (increase or decrease) in the vehicle's instantaneous fuel economy. To permit a symmetric display of both increasing and decreasing fuel economy, the zero point 104 of the fuel economy bar graph in this embodiment is most preferably located at the center of the first line of the message center as shown. The zero point may be shifted if desired. The left and right-most character in the first line of the message center display (−) and (+) characters, respectively, represent or indicate either a decreasing or increasing filtered rate of change in fuel economy as the graph extends from the zero point in the respective directions.

The graphical display of a representation of the fuel economy can be processed so as to avoid presenting distracting or erratic movement to the driver. In one embodiment, the value of the fuel economy is evaluated to determine whether it has changed too much from a previous interval. If so, the displayed value is only allowed to change by a predefined amount.

To cause the fuel economy bar in the display to move continuously or in a smooth manner, the rate of change of the vehicle's fuel economy is digitally filtered using predefined coefficients. The specific expression for the digitally filtered rate of change in fuel economy (FRC) is set forth in the following expression:

$$FRC_t = [c_3 * (IFE_t - IFE_{t-1}) * 300 + c_4 * FRC_{t-1}]/256$$

where $c_3 + c_4 = 256$.

$C_3$ and $c_4$ are filter coefficients which are specified as inputs to the configuration file for the instrumentation control unit. $IFE_t$ and $IFE_{t-1}$ are respectively, the instantaneous fuel economy at the current and previous update times. $FRC_{t-1}$ is the filtered rate of change of the fuel economy at the prior update time. To initiate the filtering process, the instrumentation control unit sets $FRC_{t=0}$ to zero. This digitally filtered rate of change of the vehicle's fuel economy is updated every 200 ms.

Figure 6:
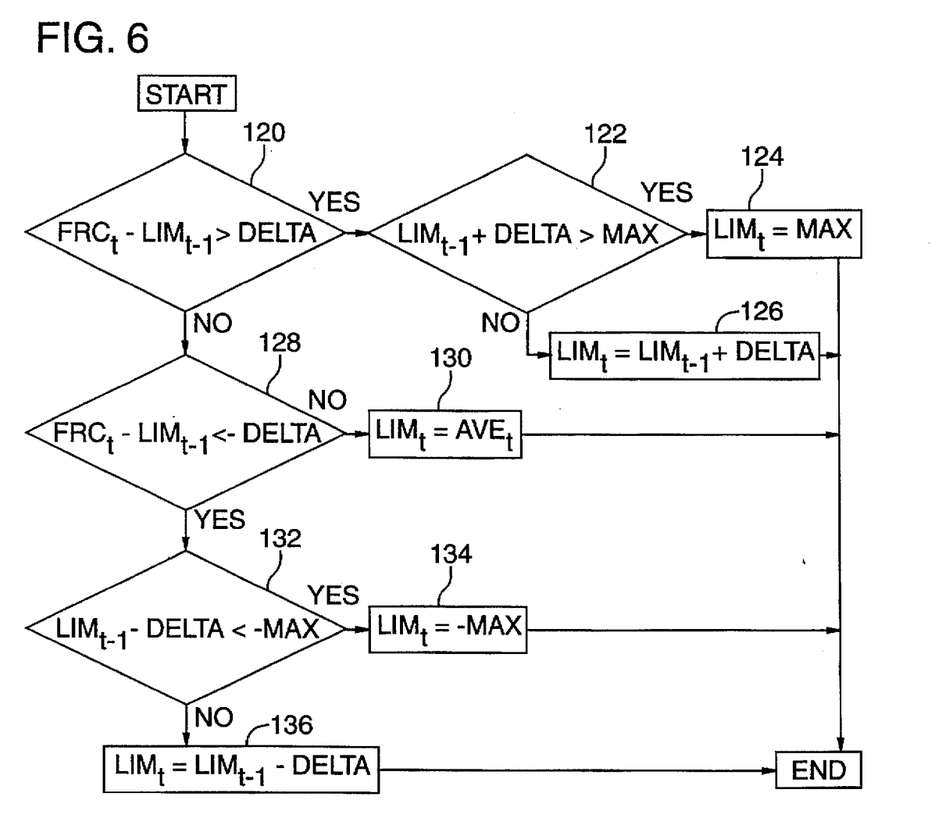
FIG. 6 is a flow diagram illustrating a method for computing the filtered rate of change of the fuel economy for display.

To avoid distracting the driver, it is important that the movement of the bar graph not appear to jump from one update to the next. To prevent distracting movement in the bar graph, a maximum change in length of the bar is limited in this implementation. For example, the maximum change in length of the bar graph is limited to five columns of dots (one character position) per update. FIG. 6 illustrates a method for converting an unrestricted filtered rate of change in fuel economy to a restricted value called "LIM".

In this embodiment, the parameters for setting up or calibrating the display of the filtered rate of change in fuel economy are defined as follows. The parameter MAX is variable and is a maximum value of the increased filtered rate of change in fuel economy to be displayed while −MAX is variable and is a maximum value of the decreased filtered rate of change in fuel economy to be displayed. In addition, DELTA is the minimum resolution of the display. For the 16 character 5×7 dot matrix display of FIG. 4 in this implementation, DELTA=MAX/7. The two opposite end characters are respectively reserved for displaying symbols indicating fuel economy is increasing (+) or decreasing (−) (see FIG. 5, line 80). The parameter MAX can be specified as an input to a configuration file for the instrumentation control unit. The value for the restricted filtered rate of change in fuel economy at time t=0 is represented by illuminating (see FIG. 4) the first or reference column of dots to the right of the center in the first line 80 of the display. Although less preferred, the reference column may be shifted to the left or right in FIG. 4. This reference column of dots is preferably always illuminated when the display (FIG. 4, FIG. 5) is showing the fuel economy bar graph. Each column of pixels in the bar graph represents a numerical value equal to DELTA/5 in this implementation. For example, when the instrumentation control unit is configured such that MAX=10.5 and the value of $LIM_t$ is computed, for example by the method of FIG. 6, to be 4.5 mpg/min, 15 columns of pixels to the right of the center in the message center will be illuminated. Similarly, when the value of the parameter $LIM_t=-1.5$ mpg/min, one column of dots to the right of center and four columns of dots to the left of center will be illuminated. Values for the parameter $LIM_t$ are rounded to the nearest multiple of DELTA/5.

FIG. 6 is a flow diagram illustrating a method for computing the restricted filtered rate of change (LIM) of the fuel economy for display to limit the amount the display of FIG. 4 changes in one time interval. The process for computing the restricted value LIM begins by checking whether the difference between the filtered rate of change in fuel economy at the current time and the restricted value for the previous time is greater than the parameter DELTA. As shown in decision block 120, the ICU determines whether the difference between the filtered rate of change for fuel economy for the current time ($FRC_t$) and the restricted value for the previous time ($LIM_{t-1}$) is greater than DELTA. If the result exceeds DELTA, then the ICU determines whether the sum of the restricted value for the previous time ($LIM_{t-1}$) and DELTA is greater than the maximum value MAX (122). If it is, the restricted value for the current time is set to the maximum value (124). Otherwise, the restricted value for the current time is set to the restricted value for the previous time plus DELTA (126).

In cases where the filtered rate of change in fuel economy is decreasing, the ICU determines whether the difference between the filtered rate of change in fuel economy for the current time and the restricted value for the previous time is less than −DELTA (128). If not, the ICU sets the restricted value for the current time to the filtered rate of change in fuel economy computed for the current time (130). In this case the filtered rate of change has not exceeded one character position which, in this specific example, was the maximum allowable change in the display for a time interval.

If the difference between the restricted value for the previous time and DELTA is less than the opposite value of the parameter MAX (−MAX) (132), then the restricted value for the current time is set to the negative value −MAX (134). If, however, the result of decision step 132 is not less than −MAX, the restricted value for the current time is set to the restricted value for the previous time less DELTA ($LIM_t=LIM_{t-1}-DELTA$)(See step 136). Using this approach, the change in the bar graph never exceeds one character position. In addition, the maximum displayed value is limited to a predefined parameter MAX or −MAX.

Figure 7:
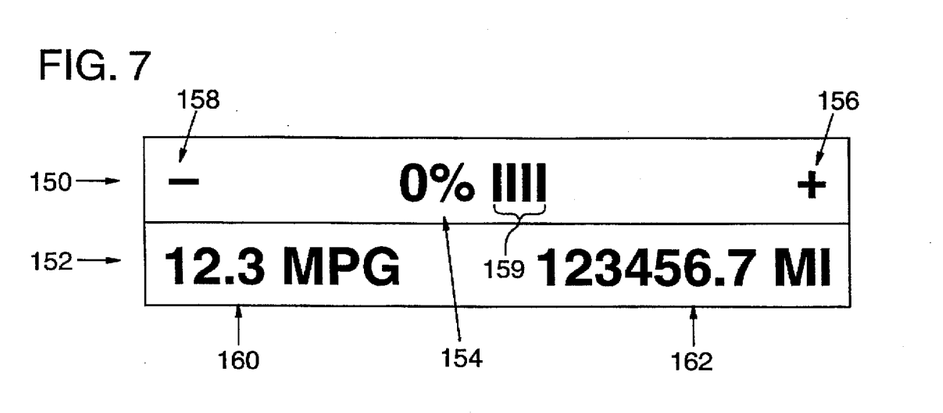
FIG. 7 is a diagram of a second embodiment of the display device.

FIG. 7 is a diagram of a second embodiment of the display device. In this embodiment, the display also includes two lines 150, 152 but has 20 display elements or characters instead of 16 as in the embodiment described above. The first line 150 displays the difference in a percentage of the filtered fuel economy as compared to a target fuel economy. The center 154 of the first line indicates the reference point of 0%. The right side 156 of the first line illustrates positive values up to 100% shown on the bar graph as "+". Conversely, the left side 158 of the first line displays negative values up to negative 100% shown on the bar graph as "−". The fuel economy reading in the bar graph is depicted with vertical bars 159, illuminated to the right, at, or to the left of the reference point 154.

As shown in FIG. 7, the second line 152 of the display in this embodiment displays DELTA fuel economy on the left side and an odometer reading on the right side. The fuel economy shown on the second line is the difference between the trip average MPG and target MPG.

Figure 8:
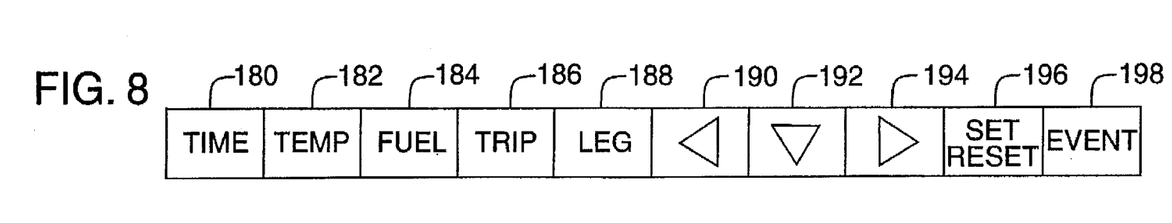
FIG. 8 is a diagram of the keypad for the ICU.

FIG. 8 is a diagram of an exemplary keypad for the ICU. The keypad may include the following dedicated keys:

| | |
|---|---|
| 1. Time | (180) |
| 2. Temperature | (182) |
| 3. Fuel Data | (184) |
| 4. Trip Data | (186) |
| 5. Leg Data | (188) |

The illustrated keypad also includes the following general purpose keys:

| | |
|---|---|
| 1. Left Arrow Key | (190) |
| 2. Down Arrow Key | (192) |
| 3. Right Arrow Key | (194) |
| 4. Set/Reset Key | (196) |

Finally, the illustrated keypad includes an event key 198 which enables the driver to specify that an event or problem has occurred with the vehicle. For example, if the driver is experiencing problems with the transmission, he or she can depress the event key to record vehicle performance and diagnostic data from the data link.

In this particular embodiment, the general purpose keys are only operable when the parking brake is applied (for safety reasons). During a set-up mode of the ICU, the driver or other user can use the keypad to set or input a target fuel economy such as in miles per gallon (MPG). The target MPG can also be set so that the target MPG is not accessible to the driver. The target MPG may alternatively be set so that the driver can adjust it. More detail regarding a specific application of the keypad is provided below.

In this implementation, the ICU digitally filters the instantaneous fuel economy to compute a filtered fuel economy, and then uses the filtered value to determine the percentage difference between the short term fuel economy and a target fuel economy. The short term fuel economy can, for example, either represent a filtered or unfiltered instantaneous fuel economy or an average value of the filtered or unfiltered fuel economy values computed over a specified number of intervals. The value for the target fuel economy employed in this calculation can be entered using the keypad. Other parameters associated with the fuel economy can also be programmed into the ICU such as the filter parameter for computing the filtered fuel economy and a parameter for specifying the number of periods over which the short term fuel economy is to be averaged.

Like the first embodiment, the instantaneous fuel economy may be computed by dividing the road speed from the fuel rate as read from PID 184 and PID 183 supplied in a message from the engine ECU.

The filtered value for the fuel economy is computed as follows:

$$MPG\_filtered_t = \frac{K * MPG\_inst + MPG\_filtered_{t-1}(255-K)}{255}$$

where the parameter K represents the filter coefficient.

If the filtered fuel economy is to be averaged over a number of intervals, the ICU computes a running sum for each of these intervals. The short-term average fuel economy is then computed as follows:

$$MPG\_short\ term = \frac{\Sigma}{N}$$

where N is a parameter from 1 to 255 representing increments of 0.2 to 51 seconds. Note that, if N equals 1, the short-term fuel economy is equal to the filtered or unfiltered instantaneous fuel economy as computed above. If N is greater than 1, then the short-term fuel economy represents an average of the values computed for the filtered instantaneous fuel economy for the specified number of intervals.

The percentage difference between the short-term average fuel economy and the target fuel economy is computed as follows:

$$PERCENT = \frac{MPG\_short\ term - MPG\_target}{MPG\_target} \times (100)$$

As an alternative to expressing the fuel economy as a percentage difference, the fuel economy can also be expressed as a difference value. For example, the difference between the short term fuel economy or the filtered instantaneous fuel economy and the target fuel economy can be computed and displayed either graphically or numerically.

Figure 9A:
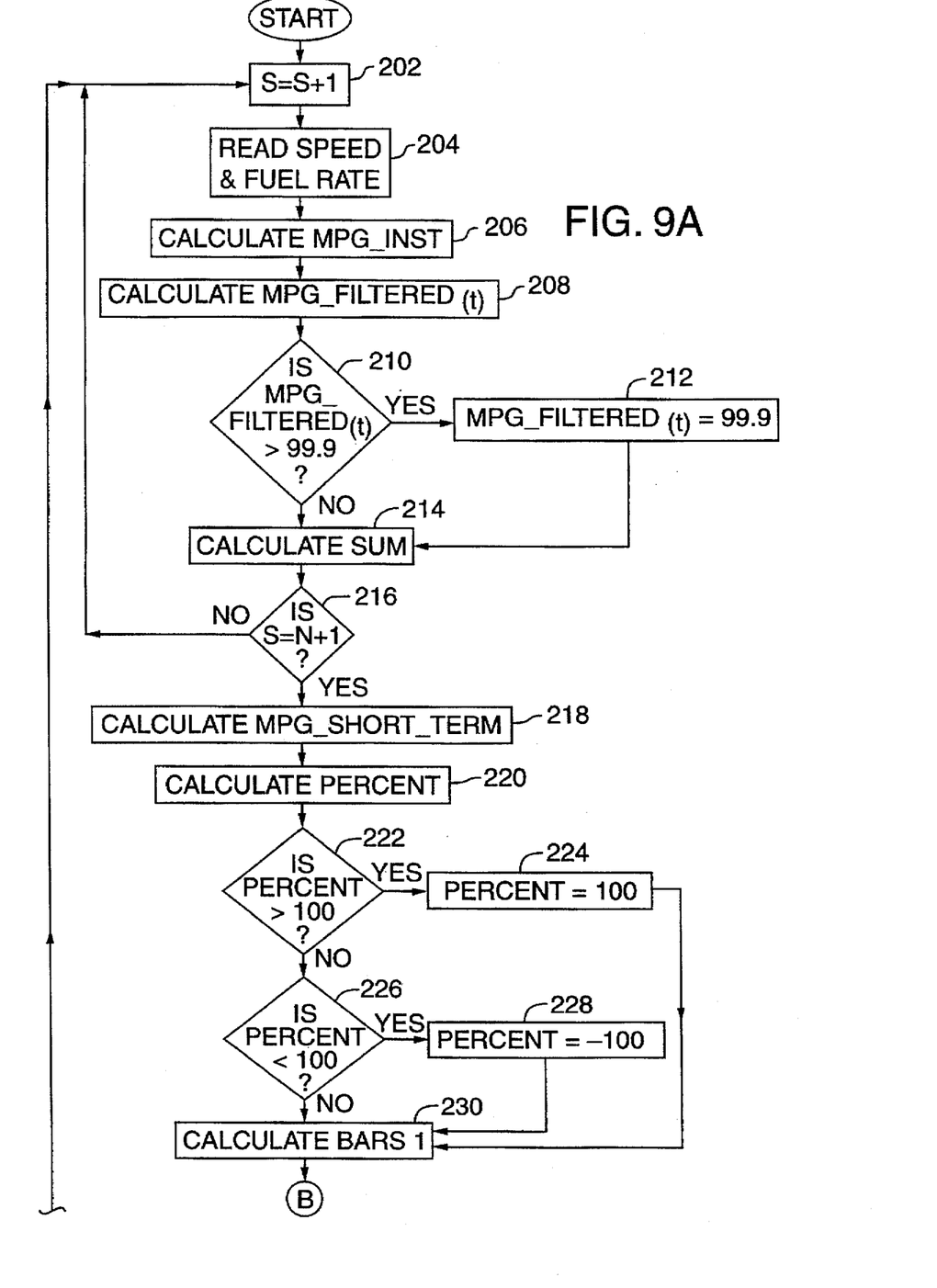
FIGS. 9A and 9B are a flow diagram illustrating a process for computing fuel economy in a second embodiment.
Figure 9B:
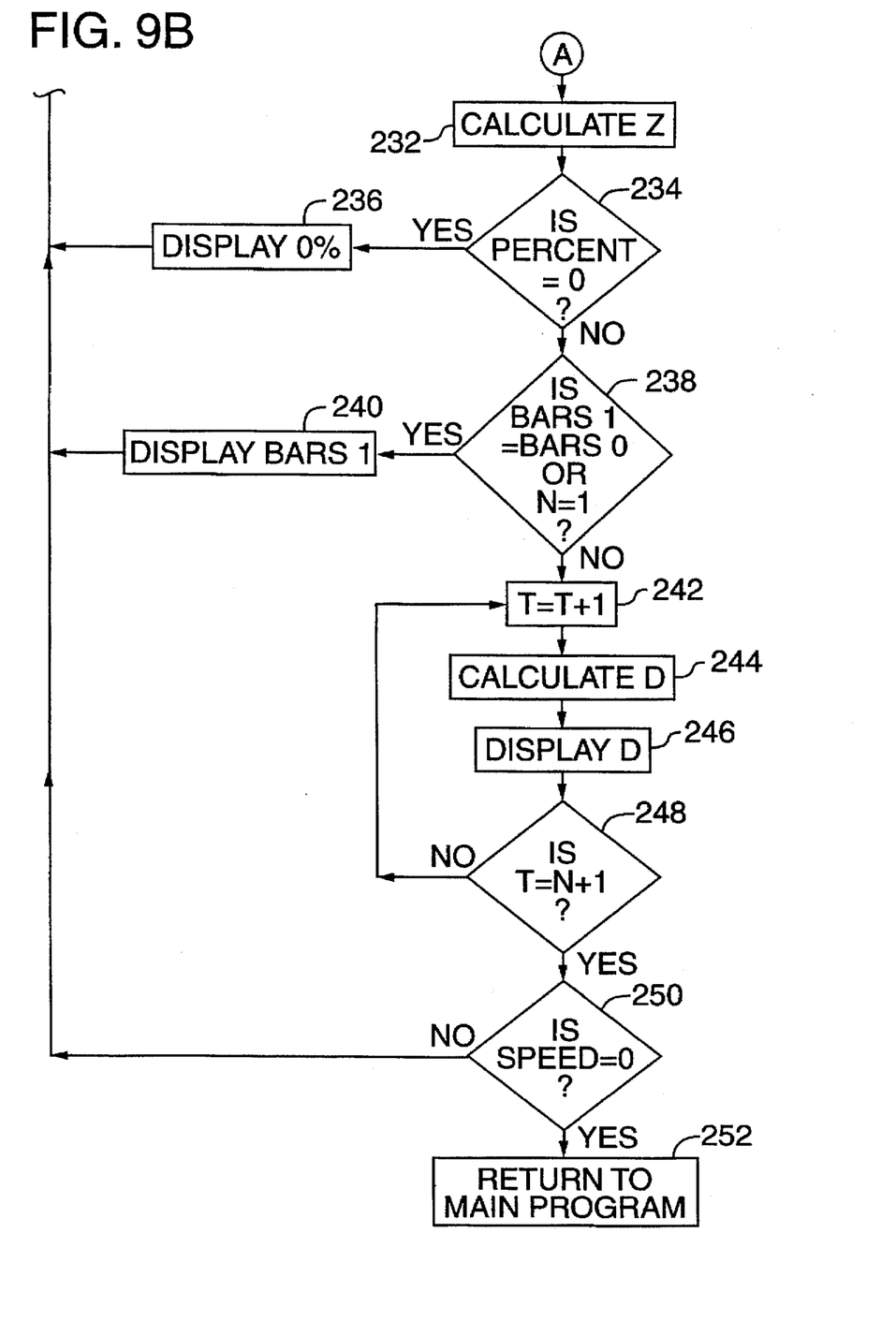

FIGS. 9A and 9B are a flow diagram illustrating a process for computing fuel economy in the second embodiment. As noted above, the filtered instantaneous fuel economy can be averaged over a number of intervals, N. This is represented in the flow diagram by a loop in which the filtered fuel economy is computed for N intervals. This implementation of the loop begins by incrementing a counter that counts up to N (202). Next, the ICU reads the fuel rate and the speed from the data link (204), and calculates the instantaneous fuel economy (MPG_INST) (206) and the filtered fuel economy (MPG_FILTERED) (208) for the current time interval t, according to the expressions set forth above.

If the filtered fuel economy exceeds a predefined maximum, in this case 99.9, it is limited to that maximum (210, 212).

Next, the ICU sums the current filtered fuel economy with the other filtered fuel economy values computed at each interval up to N (214). If the value N has not been reached (216), the ICU loops back to step 202 and repeats the process of computing the filtered fuel economy for another interval. Otherwise, it proceeds to compute the short term average fuel economy (MPG_SHORT_TERM) (218).

After computing the short term average fuel economy over N intervals, the ICU then computes the fuel economy as a percentage of a target fuel economy (220) as shown above. If the percentage value (PERCENT) is greater than 100 or less than 100, it is set to 100 and −100, respectively (222, 224, 226, 228). Otherwise, the computed percentage value is displayed to the driver.

To display the percentage value in the FIG. 7 display, the ICU enters a routine to compute the number of bars (columns of dots, for example if a matrix display such as described above in connection with FIG. 4 is used) to illuminate on the left, right, or at the reference point on line 150 the display device. In this implementation, the ICU computes a quantity referred to as BARS1 (230), which is the number of bars corresponding to the current percentage value. The expression for BARS1 is: BARS1= 0.4*PERCENT. Next, the ICU computes a value Z (232), which is the difference between the current value for BARS1 and its previous value BARS0, divided by the interval, N (Z=(BARS1−BARS0)/N). The value Z is the number of bars displayed for one interval of value N (200 milliseconds, for example) as the display changes from BARS0 (previous value) to BARS1 (present value). The value Z is used to control the display and avoid abrupt and distracting changes in the length of the bar graph display as explained further below.

If the percentage value is zero, the ICU displays 0% at the reference point (234, 236). If the current value, BARS1, equals the previously updated display value, BARS0, or N is equal to 1 (238), the ICU displays the current value, BARS1 (240). If not, the ICU enters a loop to compute a smooth transition between the last updated value BARS0 and the current update BARS1.

When the percentage value for the fuel economy changes between updates, it is preferable to compute a smooth transition by limiting the maximum transition of any one interval rather than merely update the displayed value at the end of each interval. In this implementation, the ICU displays a number of bars, D, computed by the expression D=INT(BARS0+Z*T) during the period between updates. The value of T is incremented with each increment in the interval up to N (242). The number of bar graphs to be displayed, D, is then computed again (244) and displayed (246). Decision block 248 represents a part of the loop used to calculate values for D between updates of the percentage value, PERCENT.

The process of computing fuel economy continues during normal operation of the vehicle. Decision block 250 reflects that the process for computing fuel economy resets if the speed drops to zero. As long as the vehicle is moving, the ICU continues to compute the fuel economy in this implementation. At the end of the fuel economy computation, the control path in the ICU returns to the main program (252).

Figure 10A:
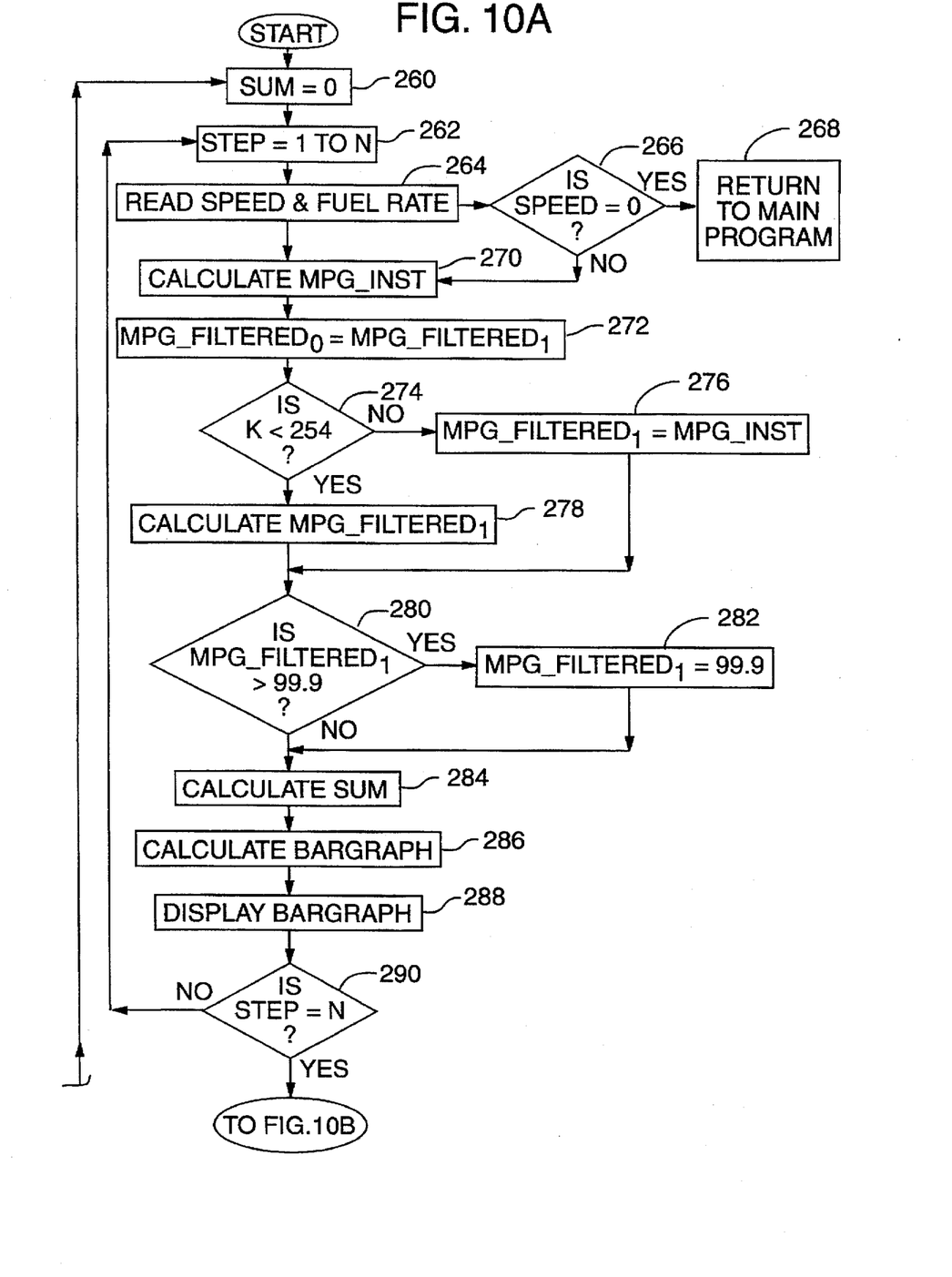
FIGS. 10A and 10B are a flow diagram illustrating a process for computing fuel economy in a third embodiment.
Figure 10B:
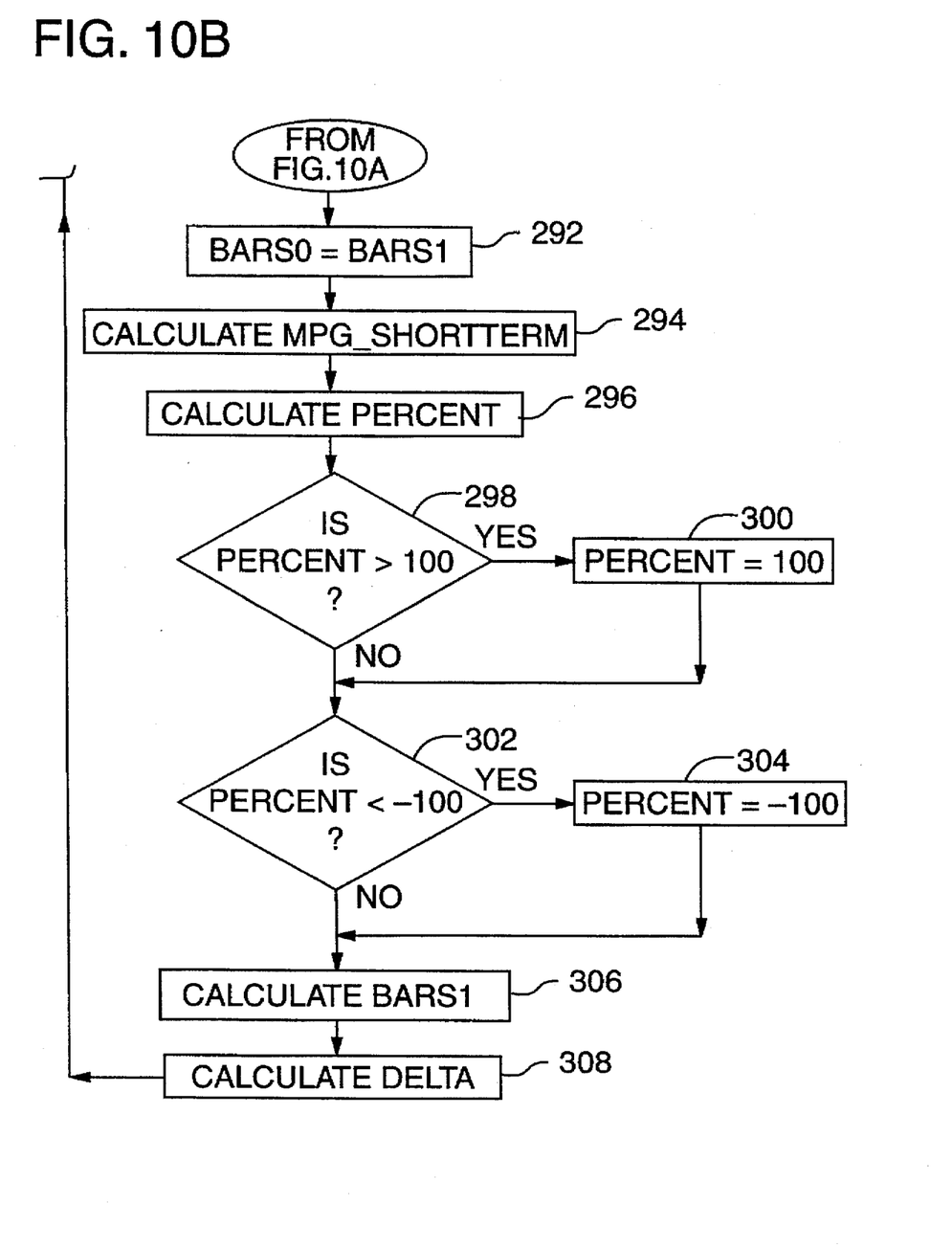

FIGS. 10A and 10B are a flow diagram illustrating a process for computing fuel economy in a third embodiment. In this particular embodiment, the filtered fuel economy (MPG_Filtered) and the bargraph display (BARGRAPH) are computed in the same loop. As shown in FIG. 10A, the bar graph display is generated using fuel economy data from a previous set of intervals from 1 to N, while fuel economy data is computed for the current set of intervals from 1 to N. This particular design is preferred in cases where the parameters used to compute fuel economy are updated at the same rate as the refresh rate of the display device. In this particular implementation, parameters representing road speed and fuel rate are updated on the data link every 200 milliseconds, and the refresh rate of the display device is also 200 milliseconds. To avoid waiting for a set of intervals from 1 to N to occur before computing and displaying a filtered value for the fuel economy, the method illustrated in FIGS. 10A and 10B computes filtered fuel economy values for a current set of intervals from 1 to N as it displays the bar graph from fuel economy data already computed in a previous set of intervals from 1 to N.

The outer loop of the method shown in FIGS. 10A and 10B begins by initializing the value of SUM. As noted above, the value SUM is used to compute an average short term fuel economy from filtered values of the fuel economy computed over a specified number of intervals, N.

The next step 262 represents the beginning of a loop over the intervals from 1 to N during which fuel economy data and the bargraph display are computed for each interval. Within this loop, the ICU reads the speed and fuel rate from the data link (264). If the speed is equal to zero (266), the ICU returns to the main program (268). If the vehicle is moving, however, the ICU proceeds to calculate a value for the instantaneous fuel economy (MPG_Inst) (270). As noted above, the ICU computes the instantaneous fuel economy by dividing the speed parameter by the fuel rate parameter.

In the next step 272, the value for the filtered fuel economy (MPG_Filtered$_1$) for the previous interval is set to the value of the filtered fuel economy computed in the last iteration of the loop. Next, the ICU determines whether the filter coefficient (K) is less than 254 (274). If not, the ICU sets the current value for the filtered fuel economy (MPG_Filtered$_1$) equal to the instantaneous fuel economy (MPG_Inst) (276). If the filter coefficient K is less than 254, the ICU calculates the value of the filtered fuel economy (MPG_Filtered$_1$) (278). The expression used for computing the filtered fuel economy in this particular implementation is set forth below:

$$MPG\_Filtered_1 = \frac{K(MPG\_Inst) + MPG\_Filtered_0(256 - K)}{256}$$

The filtered value of instantaneous fuel economy is computed by summing a current value of the instantaneous fuel economy, weighted by a first coefficient, with a previous value of the filtered fuel economy, weighted by a second coefficient, and then dividing the sum of these weighted values by a constant value (256, for example) approximating the sum of the first and second filter coefficients.

In this particular implementation, the filtered value of the fuel economy is set to the instantaneous fuel economy if K, the filter coefficient, is greater than 254. After observing the expression for the filtered fuel economy set forth above, one might think that the value of the filtered fuel economy should be set to the instantaneous fuel economy if K were equal to 255 or greater. However, in this implementation the value 255 has a different meaning in the system. Therefore, the value of 255 cannot be used for the purposes of computing fuel economy. The value, 256, is used in the denominator of the expression for the filtered fuel economy to simplify and optimize the divide operation on the ICU. It is much faster to divide by 256 rather than 255 on the ICU because the divide can be easily implemented using a shift operation.

If the value of the filtered fuel economy is greater than a threshold value, in this case 99.9 (280), the ICU sets the value of the filtered fuel economy to 99.9 (282). Otherwise, the ICU proceeds to calculate the value for SUM as shown in block 284. In this particular implementation, SUM is computed as it was in the previous embodiment described above. Specifically, the value of SUM is equal to the value currently stored for SUM plus the current value for the filtered fuel economy computed in the latest iteration of the loop.

In the next step 286, the ICU computes a value for the bar graph. The expression below sets forth how the value for the bar graph is computed in this embodiment:

$$BARGRAPH = INT(BARS0 + DELTA \times STEP)$$

The value of the bar graph is computed using values computed from the previous set of intervals ranging from 1 to N. For example, as shown in the expression above, the value of BARGRAPH is based on the value DELTA, which the ICU computed over the last set of intervals from 1 to N. The value DELTA equals the difference between the value BARS1 and BARS0 divided by the number of intervals N. BARS1 and BARS0 are the current and previous display values representing the percent change in fuel economy over a period spanning N intervals. Within the current loop from 1 to N, the ICU gradually increments the value of BARGRAPH to make a smooth transition from BARS0 to BARS1. As the ICU computes a new value of SUM for the current set of intervals from 1 to N, it is computing a value for the BARGRAPH parameter for the current set of intervals from 1 to N based on a value DELTA computed from the previous set of intervals from 1 to N. As represented in step 288, the ICU displays the current value for the BARGRAPH with each iteration of the loop from 1 to N.

When the value of the current interval is equal to N (290), the ICU sets the previous value for BARS0 to the current value (BARS1) (292). The ICU then proceeds to compute a new value for short term fuel economy, BARS1, and DELTA as set forth below. To calculate the short term fuel economy (294), the ICU divides the value of SUM accumulated for the set of intervals from 1 to N by the integer value N. The ICU then proceeds to compute a percentage change in fuel economy based on the short term fuel economy. The value, PERCENT, is computed similarly to the previous embodiment. Specifically, the value of PERCENT equals the difference between the short term fuel economy and the target value for the fuel economy divided by the target value and multiplied by 100. If the value of PERCENT is greater than 100 (298), then it is set to a limit of 100 as shown in step 300. If the value of PERCENT is less than −100 (302), then it is set to a limiting value of −100 as shown in block 304.

Next, the ICU computes the value, BARS1. The value of BARS1 is equal to the value computed for PERCENT multiplied by 0.4. In this particular implementation, the value of 0.4 is chosen to compute the value of BARS1 because there are 40 vertical bars available to display 100 different percentage values.

In the next step 308, the ICU computes the value for DELTA. The value of DELTA represents the difference between BARS1 and BARS0, the current and previous values representing the quantity to be displayed on the bar graph, divided by the number of intervals over which the short term fuel economy is computed, N. As explained above, this value of DELTA is then used in the next set of intervals from 1 to N to compute the bar graph display. As explained above, the value of DELTA is used for each iteration through the loop represented by steps 262–290 to compute an incremental change in the bar graph.

The method illustrated in FIGS. 10A and 10B is advantageous because the ICU does not have to finish computing the value SUM before computing values for the bar graph display. Instead, the value displayed in the bar graph can be computed from a value of DELTA computed on the previous pass through the outer loop of the method. This enables the value for the filtered fuel economy to be computed within the same loop as the calculation display of the bar graph.

As is apparent from the number of different embodiments described above, the specific implementation of calculation of the fuel economy can be modified in a number of different ways. The method shown in FIG. 10 is advantageous where the parameters used to compute fuel economy are updated at the same rate as the display. However, the specific manner in which the filtered fuel economy is computed and updated for display can vary.

Figure 11:
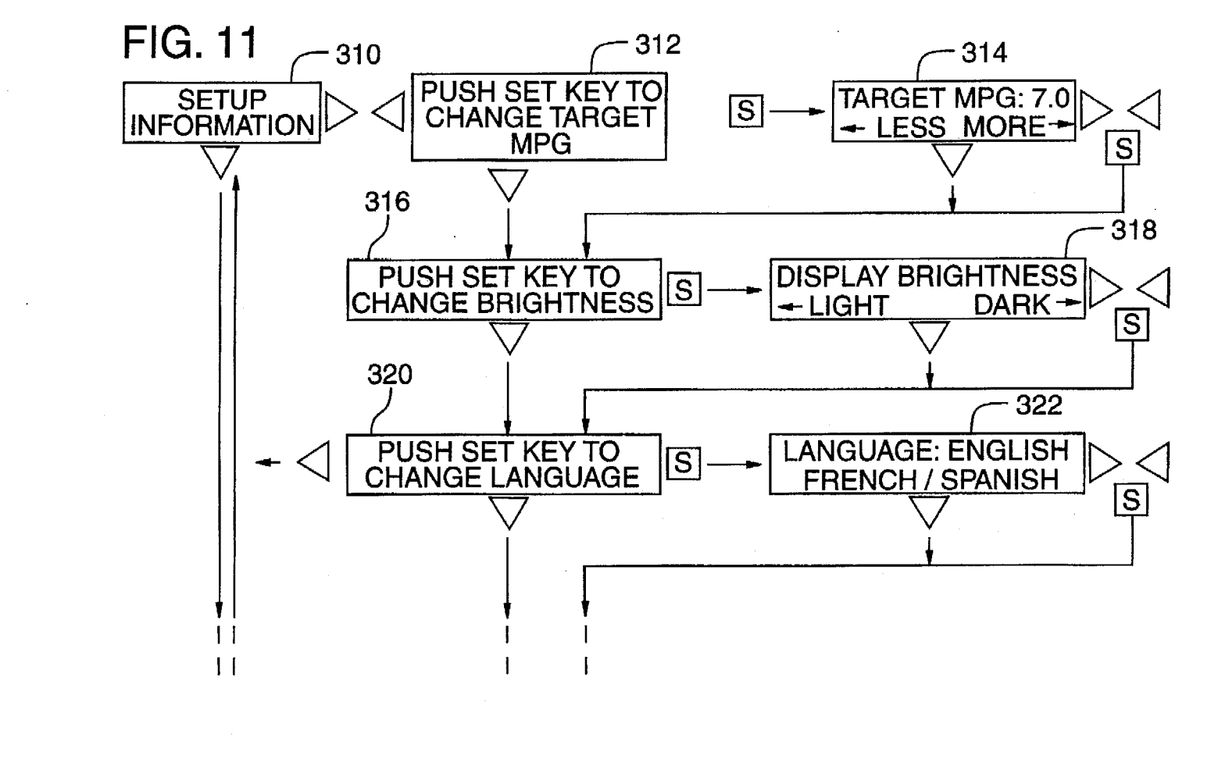
FIG. 11 is a diagram illustrating one example of set-up screens displayed by the ICU to enter a value for the target fuel economy.

FIG. 11 is a diagram illustrating one example of set-up screens displayed by the ICU to enter a value for the target fuel economy. In this particular implementation, the display of the ICU has a number of different modes depending on the status of the truck. For example, the display can enter different modes depending upon whether the truck is performing an ignition sequence, the parking brake is applied, or the parking brake is released and the vehicle is moving. For the purposes of setting the target fuel economy, the relevant mode of operation is the set-up mode when the parking brake is applied and the truck has performed its ignition sequence.

At this time, the driver or other user can use the general purpose arrow keys to scroll through a variety of message screens. The process for setting the target fuel economy begins at the main set-up screen 310. As shown in FIG. 11, by pushing the right arrow key, the user instructs the ICU to display screen 312 which provides instructions as to how to set the target fuel economy. After pressing the set/reset key, the user can change the target fuel economy using the left and right arrow keys and the display screen 314 as shown in FIG. 11. Access to the target fuel economy and other parameter inputs can be selectively restricted, for example by requiring an access code. In this way a truck owner can control who sets parameters such as target fuel economy.

After the user has completed setting the target fuel economy to the desired value, he or she can enter the value into the ICU by depressing the set/reset key. The user can then scroll through a variety of other screens to, for example, set the brightness of the display (see display screens 316 and 318), and to change the language used in the display (see display screens 320 and 322). The user can then return to the main set-up screen or continue to set other parameters. This is only one example of a technique for entering parameters into the ICU. A similar technique could be used to alter other parameters used in the computation of fuel economy. In addition, a variety of other display sequences and input commands from input device are possible.

It is also possible to adjust other parameters relating to fuel economy. For example, one may want to adjust the filter parameters in the embodiments listed above. This could be accomplished via the user interface with the help of a computer loaded with appropriate software through a J1708 interface.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

We claim:

1. An improved fuel economy device for a vehicle comprising:

a speed measuring device operable to measure speed of the vehicle;

a fuel rate measuring device operable to measure fuel rate;

a control unit in communication with the speed measuring device and the fuel rate measuring device, the control unit operable to receive the speed and fuel rate, and operable to compute and repetitively update a filtered rate of change of instantaneous fuel economy using at least a first predefined filter coefficient; and a display device in communication with the control unit, the display device operable to graphically display the filtered rate of change of instantaneous fuel economy;

wherein the display device includes a bar graph display with a first and second region and a reference point between the first and second region, the bar graph display being operable to display a portion of the first region to reflect a positive change in the filtered rate of change in instantaneous fuel economy, and being operable to display a portion of the second region to reflect a negative filtered rate of change in the instantaneous fuel economy.

2. The device of claim 1 wherein the control unit is operable to limit the filtered rate of change of instantaneous fuel economy to a predefined maximum limit; and wherein the display device is operable to display the limited filtered rate of change of instantaneous fuel economy such that the change in the illuminated portion, from one update of the display to the next, is limited to a predefined number of display elements in the bar graph display.

3. The device of claim 1 wherein the control unit is operable to compute a filtered instantaneous fuel economy at periodic intervals; and wherein the display device is operable to display and periodically update the filtered instantaneous fuel economy.

4. The device of claim 1 wherein the speed measuring device comprises a speed sensor and an engine electronic control unit, and the fuel rate measuring device comprises a fuel rate control and the engine control unit;

wherein the engine electronic control unit is operable to compute the fuel rate and the speed of the vehicle;

and wherein the engine electronic control unit is in communication with the control unit and is operable to transfer a first message including the speed and a second message including the fuel rate to the control unit.

5. The device of claim 4 wherein the engine electronic control unit and the control unit are coupled together via a serial communication bus.

6. The device of claim 1 wherein the control unit is operable to compute the filtered rate of change of instantaneous fuel economy by adding a first weighted rate of change of instantaneous fuel economy, weighted by a first filter coefficient, to a weighted value of a previously computed filtered rate of change of instantaneous fuel economy, weighted by a second filter coefficient, to compute a first sum value, and dividing the first sum value by a constant approximating the sum of the first and the second filter coefficients wherein at least one of the first or second filter coefficients is not equal to one.

7. An improved fuel economy device for a vehicle comprising:

a speed measuring device operable to measure speed of the vehicle;

a fuel rate measuring device operable to measure fuel rate of the vehicle;

a control unit in communication with the speed measuring device and the fuel rate measuring device, the control unit operable to receive the speed and fuel rate, and operable to compute and repetitively update a filtered instantaneous fuel economy, and a short term average of the filtered instantaneous fuel economy computed over a predefined period; and a display device in communication with the control unit, the display device operable to graphically display the filtered instantaneous fuel economy or the short term average fuel economy as a percentage of a user programmable target fuel economy.

8. The device of claim 7 wherein the control unit is operable to compute the filtered instantaneous fuel economy by summing a first weighted value comprising a current instantaneous fuel economy, weighted by a first filter coefficient, and a second weighted value comprising a previously computed filtered instantaneous fuel economy, weighted by a second filter coefficient, and dividing the sum of the first and second weighted values by a constant value, wherein at least one of the first or second filter coefficients is not equal to one.

9. The device of claim 7 wherein the control unit is operable to compute the short term average fuel economy by summing the filtered instantaneous fuel economy over a number of intervals and dividing the sum by the number of intervals.

10. The device of claim 7 wherein the control unit is operable to compute the percentage of target fuel economy by subtracting the programmed target fuel economy from either the short term average fuel economy or the filtered instantaneous fuel economy to compute a difference, and dividing the difference by the programmed target fuel economy.

11. The device of claim 10 wherein display device is operable to display the percentage of the target fuel economy in a bar graph with a first portion of the bar graph representing a negative percentage, and a second portion of the bar graph representing a positive percentage.

12. The device of claim 7 wherein the programmed target fuel economy is user programmable via an input device coupled to the control unit.

13. The device of claim 12 wherein the control unit is operable to control the display device to display set-up data for the programmed target fuel economy, and is operable to display the programmed target fuel economy in response to inputs entered at the input device.

14. A method for computing fuel economy in a vehicle comprising:
measuring road speed of the vehicle;
measuring fuel rate of the vehicle;
computing a current instantaneous fuel economy by dividing the road speed by the fuel rate;
computing a current rate of change in instantaneous fuel economy;
weighting the current rate of change in instantaneous fuel economy by a first filter coefficient;
weighting a previously computed filtered rate of change of fuel economy by a second filter coefficient;
summing the result of the first and second weighting steps;
dividing the result of the summing step by a predefined constant to find a current filtered rate of change of instantaneous fuel economy;
converting the current filtered rate of change of instantaneous fuel economy into a graphical quantity for display;
displaying the graphical quantity such that the current filtered rate of change of instantaneous fuel economy is conveyed to a driver of the vehicle; and
repeating the above steps to update the display of the current filtered rate of change of instantaneous fuel economy at discrete intervals.

15. The method of claim 14 wherein the processing step includes:
limiting the displayed value of the current filtered rate of change of instantaneous fuel economy when a difference between the current filtered instantaneous fuel economy and a previously displayed rate of change of instantaneous fuel economy exceeds a threshold.

16. The method of claim 14 wherein the first and second filter coefficients are user programmable values.

17. A method for computing fuel economy in a vehicle comprising:
measuring road speed of the vehicle;
measuring fuel rate of the vehicle;
computing a current instantaneous fuel economy by dividing the road speed by the fuel rate;
weighting the current instantaneous fuel economy by a first filter coefficient;
weighting a previously computed, filtered instantaneous fuel economy by a second filter coefficient;
summing the result of the first and second weighting steps;
dividing the result of the summing step by a predefined constant to find a current filtered instantaneous fuel economy;
converting the current filtered instantaneous fuel economy into a graphical quantity representing current fuel economy;
graphically displaying the current fuel economy as a percentage of a predefined target fuel economy; and
repeating the above steps to update the display at discrete intervals.

18. The method of claim 17 further including:
averaging the current filtered instantaneous fuel economy over a predefined number of intervals, wherein the number of intervals is one to compute the current instantaneous fuel economy and greater than one to compute the short term average fuel economy; and
wherein the converting step includes converting the current filtered instantaneous fuel economy or the short term average fuel economy into a graphical quantity representing current fuel economy.

19. The method of claim 17 wherein the predefined target fuel economy is programmable by a driver and by a service tool.

20. A method for computing fuel economy in a vehicle comprising:
measuring road speed of the vehicle;
measuring fuel rate of the vehicle;
computing a current instantaneous fuel economy by dividing the road speed by the fuel rate;
computing a current value of fuel economy by digitally filtering the current and one or more previous values of instantaneous fuel economy;
computing a current value of displayed fuel economy by converting the current value of the fuel economy into a graphical quantity for display on a display device;
comparing the current value of the displayed fuel economy with a previously displayed value of the fuel economy to determine the difference between the current and previous values of displayed fuel economy;
limiting the current value of the displayed fuel economy if the difference between the current and previous values of the displayed fuel economy is greater than a predefined threshold;
displaying the current value of the displayed fuel economy on the display device;
repeating the above steps to update the display of the current displayed fuel economy at discrete intervals.

21. An improved fuel economy device for a vehicle comprising:
a speed measuring device operable to measure speed of the vehicle;
a fuel rate measuring device operable to measure fuel rate of the vehicle;
a control unit in communication with the speed measuring device and the fuel rate measuring device, the control unit operable to receive the speed and fuel rate, and operable to compute and repetitively update a filtered instantaneous fuel economy, or a short term average of the filtered instantaneous fuel economy computed over a predefined period; and
a display device in communication with the control unit, the display device operable to numerically display the filtered instantaneous fuel economy or the short term average fuel economy as a percentage of a user programmable target fuel economy and the filtered instantaneous or short term average fuel economy.

* * * * *

UNITED STATES PATENT AND TRADEMARK OFFICE
CERTIFICATE OF CORRECTION

PATENT NO. : 5,693,876
DATED : DECEMBER 2, 1997
INVENTOR(S) : Nicolae Ghitea Jr. and James M. Ehlbeck It is certified that error appears in the above-identified patent and that said Letters Patent is hereby corrected as shown below:

Column 2, line 37, "value the" should read --value of the--.

Column 5, line 63, "detelting, this" should read --detecting this--.

Signed and Sealed this

First Day of September, 1998

Attest:

BRUCE LEHMAN

*Attesting Officer*   *Commissioner of Patents and Trademarks*